Patented Jan. 28, 1941

2,229,781

UNITED STATES PATENT OFFICE 2,229,781

LAMINATED GLASS

Adolf Weihe, Bad Soden in Taunus, and Arthur Voss, Frankfort-on-the-Main-Hochst, Germany, assignors, by mesne assignments, to General Aniline & Film Corporation, New York, N. Y., a corporation of Delaware No Drawing. Application June 6, 1939, Serial No. 277,634. In Germany June 8, 1938

6 Claims. (Cl. 49—92)

The present invention relates to a laminated glass.

It is known that the acetal-like condensation products of polyvinyl alcohol with aldehydes may be applied for the manufacture of laminated glass.

The adhesion of the intermediate layers prepared from such polyvinyl-acetals together with softening agents is, however, not sufficient for all cases. The sheets made from these products may be stripped from the glass relatively easily.

According to this invention extraordinarily strongly adherent intermediate layers are obtained by means of acetals of polymerization products containing free hydroxyl groups and free carboxylic acid groups. These acetals may be prepared, for instance, by saponifying interpolymerization products of vinyl esters of organic carboxylic acids with compounds of the group consisting of unsaturated aliphatic carboxylic acids, the alkali metal and ammonium salts thereof and the esters and anhydrides thereof.

As is known, polymeric acetals are obtained thereby containing a certain number of carboxyl groups besides the acetalized hydroxyl groups derived from the saponified polyvinyl ester component. When maleic acid or a functional derivative thereof is used as one component two of these carboxyl groups are bound each to a separate carbon atom, which atoms are adjacent. For the acetalization there may for instance be used the saponification products of interpolymerizates described in U. S. Patent No. 2,047,398. Such interpolymerizates may be prepared by means of vinyl formate, vinyl acetate, vinyl propionate or vinyl butyrate. Besides maleic acid there may be used as the acid component: acrylic acid, crotonic acid, methacrylic acid, angelic acid, tiglic acid as well as the sodium, potassium and ammonium salts thereof, the methyl-, ethyl-, propyl- and butylesters thereof and, in the case of dibasic acids, the anhydrides of the acids. The saponification may be performed in an aqueous or organic medium with acids such as hydrochloric acid, sulfuric acid or sulfonic acids such as isobutylnaphthalene sulfonic acid; furthermore with alkalies such as potassium hydroxide, sodium hydroxide, ammonia, sodium carbonate or potassium carbonate. The acetalization may for instance be carried out in an aqueous or organic medium in the presence of an acid such as hydrochloric acid or sulfuric acid, if necessary with the application of heat. The saponification and the acetalization may also be performed in a single operation.

As aldehydes there may be used, for instance, formaldehyde and especially aldehydes containing 2 to 8 carbon atoms such as acetaldehyde, propionaldehyde, butyraldehyde, isobutyraldehyde, the hexyl-, heptyl- and octylaldehydes.

The polyvinyl acetal which is still moist with water from its process of manufacture may be treated directly with a gelatinizing agent in a kneading machine whereby the water separates and may be removed by tilting the machine. The mass obtained may be rolled into sheets on a multiple roller calender.

The polyvinyl acetal moist with water may also be treated with dilute alcohol in order to separate the main quantity of the water; the product may then be worked as described above to a mass capable of being treated on a calender.

Finally the product may be dried and dissolved in a solvent.

The products thus obtained are useful as the intermediate layer for uniting two sheets of glass in the manufacture of laminated glass. It is, however, also possible to combine more than two sheets of glass by a corresponding number of intermediate layers of the products. Softening agents such as 2-ethyl-hexandiol-1.3 or solvents of high boiling point may be incorporated into the intermediate layers.

The laminated glass may be prepared with the aid of finished films or foils consisting of a product of the kind defined above, or the product may be transformed into the softened condition by heating and then placed between the sheets of glass, or a solution of the product in an organic solvent may be poured on the sheets of glass which are then pressed together in a manner usual for the manufacture of laminated glass.

The following examples serve to illustrate the invention, but they are not intended to limit it thereto; the parts are by weight:

(1) 100 parts of a polyvinylbutyraldehyde acetal prepared by acetalizing a saponified interpolymerizate of 16 mols of vinyl acetate and 1 mol of maleic acid dimethyl ester are mixed with 66 parts of the ester from diglycolic acid and isoheptyl alcohol. The mixture is plastified in a kneading machine capable of being heated with addition of 11 parts of methoxybutanol while slowly increasing the temperature to 80° C. A colorless mass is obtained which may be extended on a multiple roller calender to soft somewhat sticky sheets. A sheet of a thickness of 0.6 mm. is formed and is laid on a glass plate of thickness 3 mm. The sheet is then covered with a glass plate of thickness 2.2 mm. and the laminated glass is pressed at 120° C. while slowly increasing the pressure up to 70 kilos per square centimeter. The laminated glass remains under this pressure for 2 hours and is then cooled under pressure to room temperature.

When a steel ball weighing 790 grams is caused to fall upon this laminated glass from a height of 2 meters at temperatures between —25° C. and +40° C. the appearance of the glass plate corresponds to that theoretically required by a good laminated glass. No loose splinters are produced. All splinters very firmly adhere to the elastic intermediate layer.

(2) A sheet of 0.6 mm. thickness is prepared from the isobutyraldehyde acetal from the saponification product of an interpolymerizate made from 12 parts of vinyl acetate and 2 parts of acrylic acid methyl ester, 20 percent of a suitable softening agent having been added to the acetal and this sheet is placed between two plano-parallel glass plates which are then pressed together in known manner at about 90° C. while slowly increasing the pressure and taking care that no air bubbles are formed between the plates.

A safety glass is obtained which can be knocked to pieces only with difficulty and when finally broken does not scatter in splinters but remains firmly adherent to the very elastic intermediate layer. This security against breaking remains practically unchanged within a temperature range from +50° C. to —30° C.

(3) By using instead of the above mentioned acetal an acetal of isohexylaldehyde with the saponified interpolymerizate from 8 parts of vinyl acetate and 1 part of crotonic ethyl ester, a laminated glass having similarly good properties is obtained.

It is, of course, also possible to apply solutions of the polymerizates to the glass sheets, to remove the solvent by evaporation and to stick the sheets together while taking care that no air bubbles are formed.

We claim:
1. A laminated glass comprising at least two sheets of glass and at least one intermediate layer comprising an acetal of a polymerization product containing free hydroxyl groups and free carboxylic acid groups.

2. A laminated glass comprising at least two sheets of glass and at least one intermediate layer comprising an acetal of an aliphatic aldehyde with a polymerization product containing free hydroxyl groups and free carboxylic acid groups.

3. A laminated glass comprising at least two sheets of glass and at least one intermediate layer comprising an acetal of an aliphatic aldehyde containing between 2 and 8 carbon atoms with a polymerization product containing free hydroxyl groups and free carboxylic acid groups.

4. A laminated glass comprising a least two sheets of glass and at least one intermediate layer comprising an acetal of butyraldehyde with a saponified interpolymerization product of vinyl acetate and maleic acid dimethylester.

5. A laminated glass comprising at least two sheets of glass and at least one intermediate layer comprising an acetal of isobutyraldehyde with a saponified interpolymerization product of vinyl acetate and acrylic acid methylester.

6. A laminated glass comprising at least two sheets of glass and at least one intermediate layer comprising an acetal of isohexylaldehyde with a saponified interpolymerization product of vinyl acetate and crotonic acid ethylester.

ADOLF WEIHE.
ARTHUR VOSS.